(12) United States Patent
Chang

(10) Patent No.: US 10,852,354 B1
(45) Date of Patent: Dec. 1, 2020

(54) SYSTEM AND METHOD FOR ACCELERATING REAL X DETECTION IN GATE-LEVEL LOGIC SIMULATION

(71) Applicant: Avery Design Systems, Inc., Tewksbury, MA (US)

(72) Inventor: Kai-Hui Chang, Andover, MA (US)

(73) Assignee: Avery Design Systems, Inc., Tewksbury, MA (US)

( * ) Notice: Subject to any disclaimer, the term of this patent is extended or adjusted under 35 U.S.C. 154(b) by 0 days.

(21) Appl. No.: 16/685,993

(22) Filed: Nov. 15, 2019

Related U.S. Application Data

(60) Provisional application No. 62/768,438, filed on Nov. 16, 2018.

(51) Int. Cl.
| | |
|---|---|
| *G06F 30/337* | (2020.01) |
| *G01R 31/3183* | (2006.01) |
| *G06F 30/3308* | (2020.01) |
| *G06F 119/02* | (2020.01) |

(52) U.S. Cl.
CPC ... *G01R 31/318357* (2013.01); *G06F 30/337* (2020.01); *G06F 30/3308* (2020.01); *G06F 2119/02* (2020.01)

(58) Field of Classification Search
CPC .......... G01R 31/318357; G06F 30/337; G06F 30/3308
USPC ........................................................ 716/106
See application file for complete search history.

(56) References Cited

U.S. PATENT DOCUMENTS

| | | | | |
|---|---|---|---|---|
| 6,035,107 | A * | 3/2000 | Kuehlmann | G06F 30/3323 716/103 |
| 7,596,770 | B1 * | 9/2009 | Kuehlmann | G06F 30/3312 716/106 |
| 8,402,405 | B1 | 3/2013 | Chang | |
| 2003/0225552 | A1 * | 12/2003 | Ganai | G06F 30/3323 703/2 |
| 2016/0077154 | A1 * | 3/2016 | Amar | G06F 30/3323 714/732 |
| 2016/0125111 | A1 * | 5/2016 | Yu | G06F 30/3323 716/106 |
| 2020/0074019 | A1 * | 3/2020 | Amaru | G06F 30/327 |

* cited by examiner

*Primary Examiner* — Suchin Parihar
(74) *Attorney, Agent, or Firm* — Loginov & Associates, PLLC; William A. Loginov

(57) ABSTRACT

A computer executable tool analyzes Boolean logic in a gate-level netlist with simulated values and efficiently determines whether a subset of the netlist produces real Xs or not. If whether the netlist produces real Xs or not cannot be quickly determined, further formal analysis needs to be performed, and this step can be time-consuming. By quickly determining whether real Xs are produced, the use of time-consuming formal methods can be reduced, thus reducing X-pessimism analysis time.

19 Claims, 4 Drawing Sheets

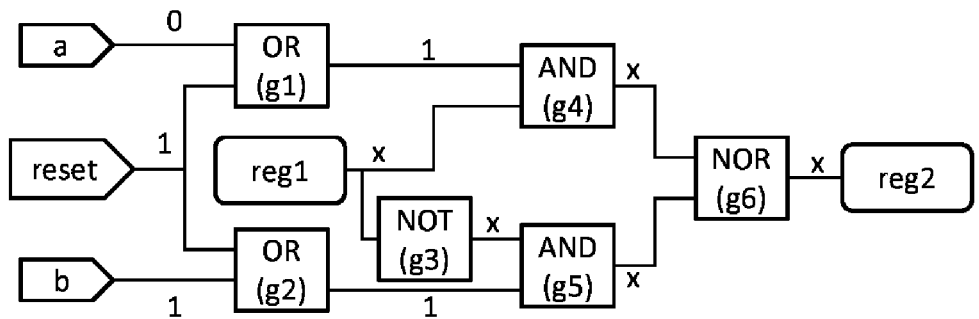
FIG. 1
```
always @(g1.o or g2.o or reg1.q)
if (g1.o === 1'b1 && g2.o === 1'b1 && reg1.q === 1'bx)
    force g6.o = 1'b0;
else
    release g6.o;
```
FIG. 2
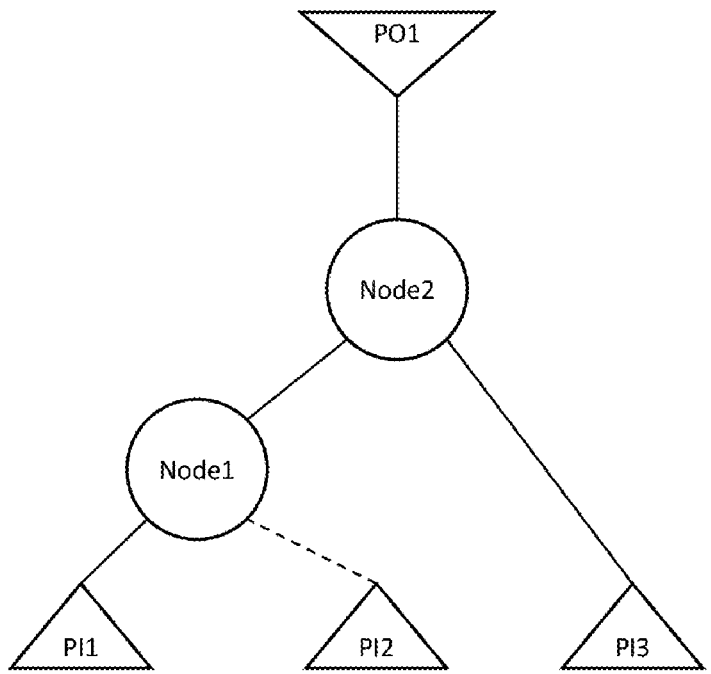
FIG. 3

SYSTEM AND METHOD FOR ACCELERATING REAL X DETECTION IN GATE-LEVEL LOGIC SIMULATION

RELATED APPLICATIONS

This application claims the benefit of U.S. Provisional Application Ser. No. 62/768,438, filed Nov. 16, 2018, entitled SYSTEM AND METHOD FOR ACCELERATING REAL X DETECTION IN GATE-LEVEL LOGIC SIMULATION, the entire disclosure of which is herein incorporated by reference.

FIELD OF THE INVENTION

The invention relates generally to integrated circuit design and, most particularly, to techniques for correcting gate-level logic simulation when unknowns (Xs) exist.

BACKGROUND OF THE INVENTION

The invention is an extension to the inventor's prior art, "System and Method for Correcting Gate-level Simulation Accuracy when Unknowns Exist," U.S. Pat. No. 8,402,405, the teachings of which are hereby expressly incorporated by reference. In the prior art, a method for identifying false Xs and generating fixes was disclosed, and a methodology to correct gate-level simulation was proposed.

In the prior art, the system and method to identify false Xs work as follows. The input to the method is a register data input, d, that has X in logic simulation. The method returns true if the X is false; otherwise, false is returned. The fan-in cone circuit is also returned in subckt. This is achieved using the following steps.

(1) Trace the fan-in cone of d along the variables whose logic simulation values are Xs. Add all the gates along the trace to subckt. Stop when the variable is a primary input of the design or an output of a register.

(2) Build a Boolean function from subckt. The output of the function is d, and the inputs are the primary inputs of subckt. For each input, check its logic simulation value. If the value is not X, propagate the non-X value through the input to simplify the Boolean function. If the value is X, the input remains an input of the simplified Boolean function.

(3) Use a Boolean solver to check whether the output is constant. If so, return true. Otherwise, return false. subckt is also returned. True means a false X is found.

After false X is identified, our prior art minimizes X-eliminating sub-circuit to generate compact fixes to eliminate the false X. An example to repair the X-pessimism problem in FIG. 1 is shown in FIG. 2. The generated code can fix all false Xs that match the condition.

Step (3) in the above procedure can be time consuming because a Boolean solver is used, and formal Boolean analysis typically requires more time to perform. Given that most Xs are real Xs instead of false Xs, techniques to quickly determine whether the Boolean function is a real X can reduce runtime. If the Boolean function for the subckt output is a real X, then no further formal analysis and proving will be needed.

One way to quickly determine if the output of subckt is non-constant (real X) is to perform random simulation on the inputs of subckt and see if the output can have different values. If the output already has two different values from the applied input patterns, then subckt generates a real X, and no further processing is needed. However, it is well-known that many Boolean functions require special patterns to produce specific output values, and random patterns can have a very small probability of hitting those special patterns. As a result, many Boolean functions still need to be formally analyzed even though their outputs are not constants. This invention addresses this issue by generating the special patterns, also called vectors, and then use them in simulation to produce different values at subckt output to show that the output is not constant and is a real X.

The vectors are useful for reducing real X detection time when the same subckt is encountered again in future analysis. Typically the same subckt can be encountered many times in gate-level simulation throughout the verification process because there can be many tests that need to be run on a netlist. Since the netlist remains the same, the same real X scenario can be encountered many times for different tests. Additionally, for netlists with similar functionalities, the same logic can appear in different netlists, too. For example, designs with only minor revisions should have most logic remain unchanged. As a result, being able to generate vectors for proving that subckt have real Xs can be very useful.

SUMMARY OF THE INVENTION

In this invention we use And-Inverter-Graph (AIG) to represent the Boolean function in subckt. An AIG contains AND nodes that have two inputs, possibly inverted, and the outputs are the Boolean AND of their inputs. There are also special nodes in an AIG including output nodes that are driven by AND nodes, and input nodes that drive inputs to AND nodes. An example AIG is shown in FIG. 3.

To improve performance, multiple subckts may be converted to an AIG and analyzed simultaneously. In this case the AIG will have multiple outputs. In this invention we designed our system and method to handle both single-output and multi-output AIGs.

This invention improves the performance of the prior art method by representing the Boolean function using an AIG. If random simulation failed to determine whether the outputs of the AIG are constant or not, the AIG is saved and analyzed. If the outputs are not constant, vectors that can produce both 0 and 1 values on each output are saved. The vectors can then be used in future analysis that if the same AIG is encountered, the solved vectors can be used to replace random vectors in the random simulation step, and can quickly show that all outputs are not constants. This allows skipping the time-consuming formal analysis step that proves whether the outputs are constant or not.

BRIEF DESCRIPTION OF THE DRAWINGS

For a more complete understanding of the invention, reference should be made to the following detailed description and accompanying drawing figures, in which like reference numerals identify like elements in the figures, and in which:

FIG. 1 illustrates an example of X-pessimism. The output of g6 should be 0 but logic simulation incorrectly produces X.

FIG. 2 presents example code generated by prior invention to fix the X-pessimism problem in FIG. 1. The output port of a combinational gate is named "o", and the output of a register is named "q".

FIG. 3 illustrates an example of And-Inverter-Graph (AIG). The Boolean function has three inputs PI1, PI2, and PI3. It has one output, PO1. It also has two AND nodes, Node1 and Node2. Dotted line represents inversion. Boolean function at output of Node1 is PI1 ∧PI2'. The Boolean function at the output of Node2, which drives PO1, is PI1 ∧PI2' ∧PI3 (' denotes negation).

DETAILED DESCRIPTION

The goal of this invention is to efficiently determine if a sub-circuit consisting of Boolean logic gates generates constant values at the sub-circuit's outputs or not. The following steps achieve this goal.

To improve performance of X-pessimism analysis described in prior approaches, the following steps are added to step (3) described in "Background of the Invention" above.

(1) If random simulation cannot determine whether the outputs of the sub-circuit being analyzed are constant or not, convert the sub-circuit into an AIG.

(2) Calculate a structure-based hash number for the AIG.

(3) Look up vectors from the "vector database" using the hash number. Vector database saves vectors that can distinguish outputs of a given AIG with the same hash number. The generation of vector database will be discussed later. If vectors for the hash number exist, the vectors are applied to the primary inputs of the AIG to replace random patterns for simulation.

(4) If the status of the AIG's outputs still cannot be determined, no matter vectors were found for the hash number or not, the AIG is formally analyzed. If the outputs are not constant values, vectors that can distinguish all outputs are produced and saved into the vector database.

For step (4), the learning of AIG to produce vectors can be performed online during simulation or offline after simulation. When performed online, a different thread or process can be used for better performance, and the results can be used for subcircuits that may be encountered later in simulation. If performed offline, the AIG should be saved into a file, and then the learning process is performed offline after simulation finishes as an additional post-processing step. The learned results can be saved in a vector database file. The file can then be read and the vectors used in future X-pessimism analysis runs.

Figure 4:
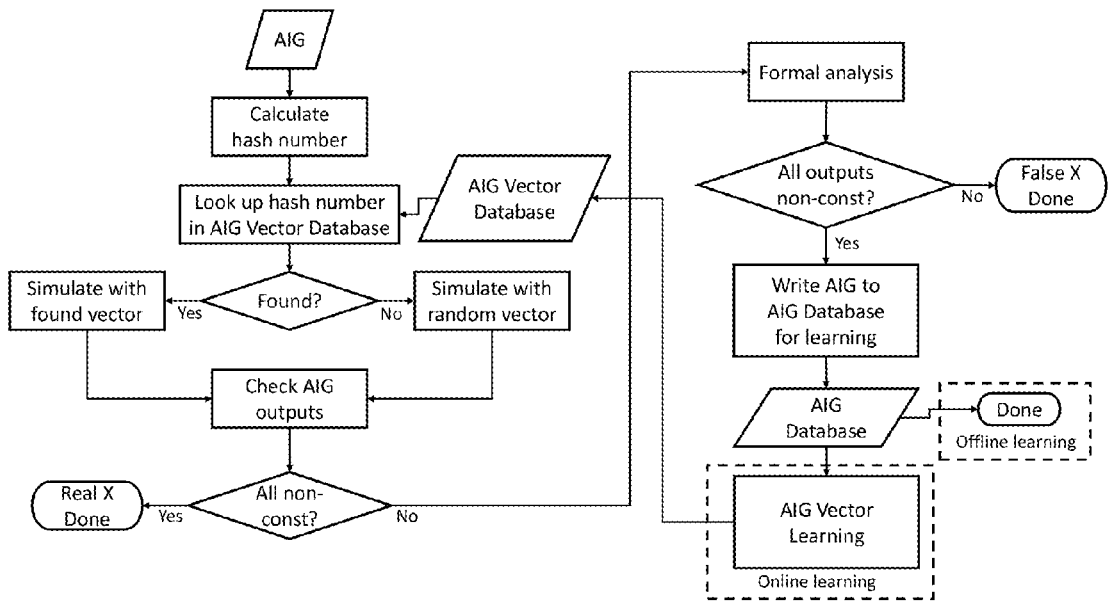
FIG. 4 illustrates the flow for using learned AIG vectors to accelerate real X detection.

FIG. 4 provides a flow chart that summarizes the flow.

The generation of hash number must be efficient so that it does not slow down X-pessimism analysis. The hash number was designed not to be unique for an AIG because a unique hash number for each AIG requires too many bits to consider all possible AIG structures and is computation and memory expensive. In this invention we use a two-level hash number. The first level is number of inputs of the AIG. If the numbers of inputs are different for two AIGs, then it is not possible that the AIGs are the same. And because the numbers of inputs are different, vectors calculated from one AIG cannot be applied to the other one. As a result, we use number of inputs as the first hash number.

Figure 5:
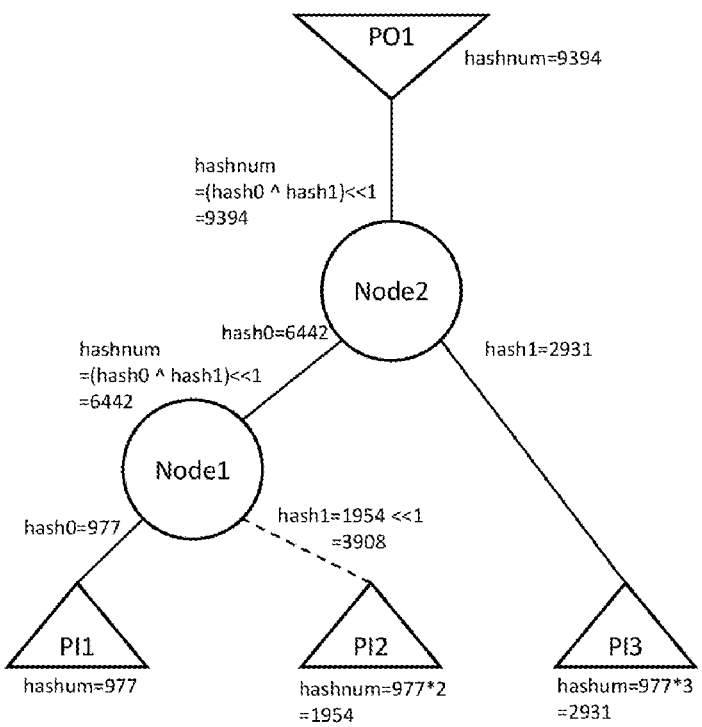
FIG. 5 provides an example of AIG hash number calculation. Variable hash0 and hash1 are local variables for intermediate hash number calculation. The final hash number for each node is saved in variable hashnum.

The second level hash number is a 32-bit integer and is calculated using the following steps. In these steps, we use variable hashnum to save the calculated hash number for each node, and we use local variable hash0 and hash1 to save intermediate results. First, input i is assigned a number equal to i×977. Then a depth-first traversal is performed on the AIG. For a node, its number is calculated by first getting number hash0 from its first input. If the input is inverted, hash0 is shifted left by 1. Then it gets number hash1 from its second input. If the input is inverted, hash1 is shifted left by 1. Value for hashnum is then obtained using hash0⊗hash1. Then hashnum is shifted left by 1 with the Most Significant Bit (MSB) becoming its Least Significant Bit (LSB) (also called rotate shift). Value of hashnum then becomes node's hash number. The final number for the whole AIG is calculated from the numbers at its primary outputs. For each output the final hash number is the current number XOR the output's number, and then the number is rotate shifted left by 1. FIG. 5 provides an example that shows the calculated hashnum for an AIG using the steps.

There are many different ways for calculating a hash number for an AIG. In this invention we provide one possible implementation but any implementation that serves the same purpose can be used.

The reason why the hash number does not need to be unique for each AIG is because if vectors for a different AIG with the same hash number is applied to an AIG, the vectors will not have intended distinguishing power for the current AIG's outputs. However, this is not any different from a random vector and does not affect correctness or efficiency.

This mechanism is efficient because finding vectors for an AIG can be done with simple hash number matching, which takes O(1) time. In this invention we use a 32-bit integer to save the vector for each AIG input. As a result, up to 32 vectors can be saved for each hash number. Then for each AIG with n inputs, we only need to save n integers, which is memory efficient. Because vectors from different AIGs with the same hash number are accumulated in the vector database, our invention can also efficiently handle the case where different AIGs happen to have the same hash number: as long as the total number of vectors for different AIGs is smaller than 32, the vectors can distinguish outputs of all the AIGs.

Figure 6:
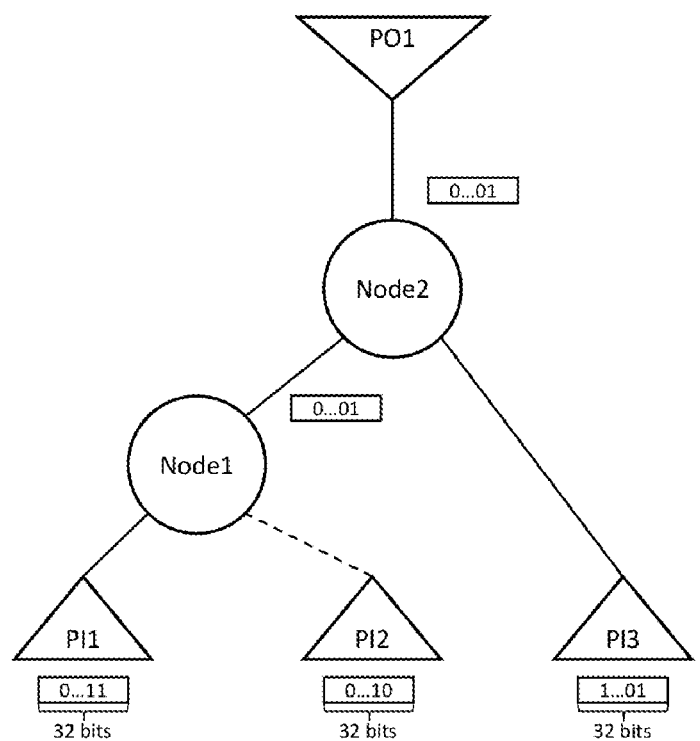
FIG. 6 provides an example on how vectors are saved for an AIG and how the vectors are used for simulation. In this invention, we use one integer (32-bit) to save the vectors for each input. The same bit of integers for different inputs all correspond to the same vector. In this example because the AIG has three inputs, three integers are used. Two vectors are used to distinguish the output of the AIG, and they are saved using two bits in each integer at BIT1 and BIT0. The first vector at BIT0 for input {PI1, PI2, PI3} is {1, 0, 1}. The second vector at BIT1 is {1, 1, 0}. Simulating these vectors produces 1 at BIT0 for PO1, and 0 at BIT1 for PO1, showing that the primary output can have different values. This means the AIG output is not constant and is a real X.

FIG. 6 provides an example on how the vector is saved and used in simulation.

To generate vectors for distinguishing all AIG outputs, in this invention we convert the AIG to Conjunctive Normal Form (CNF) and use the following steps to produce the vectors. Initially n is set to 2.

(1) Duplicate the CNF n times. Corresponding outputs for each copy of the CNF are ANDed and the AND output is constrained to 0; the outputs are also ORed and the OR output is constrained to 1. Because inputs to a copy of the CNF represents one vector, these constraints make sure at least one output is 0 and at least one output is 1 for the n input vectors, meaning that the vectors can distinguish the output and show that it is not constant.

(2) Use a SAT solver to solve the CNF. If the problem is satisfiable (SAT), vectors can be derived from the values assigned by the SAT solver to the inputs of each copy of the CNF. If the problem is unsatisfiable (UNSAT), increase n by 1 and go to (1). Repeat until the problem is SAT.

This method can find the minimal number of vectors that can distinguish all outputs of the AIG. Currently we set the maximum n to 32 and abort the search if the problem is still UNSAT to limit runtime.

It is possible that some of the AIG outputs are constant 0/1 and no set of vectors can distinguish that output. To check this, if the problem is UNSAT when n is 3, we use SAT solver to check whether any output is constant at this time. If any output is constant, no vectors exist to distinguish that output, and search is terminated.

To check if any output is constant, we convert the AIG to CNF, constrain each output to 0 and then 1, then call SAT solver. If constraining the output to 0/1 is UNSAT, then the output is constant I/O because it means the output cannot have the constrained value.

The method shown above to compute vectors for distinguishing AIG outputs is one possible method and is used as an example. Any method that can generate vectors to distinguish outputs can be used without departing from the spirit of this invention.

In this invention AIG, CNF and SAT solvers are used but any form of logic representation and Boolean manipulation that serve the same purpose, such as Disjunctive Normal Form (DNF) and Pseudo-Boolean solvers, can be used without departing from the essence of methods presented in this invention. The use of AIG, CNF and SAT solver is an example implementation of the presented invention but does not limit this invention to these implementations.

Figure 7:
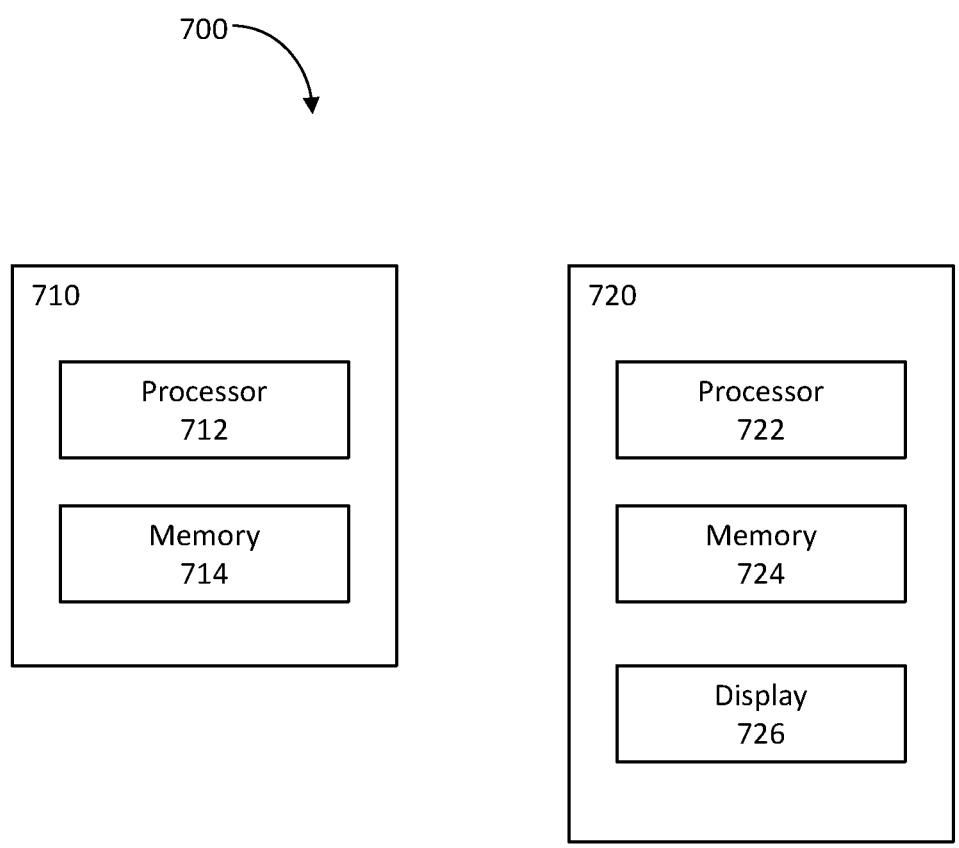
FIG. 7 is a block diagram of a system 700 for implementing the processes and/or subprocesses described above according to aspects of the disclosure, for example FIGS. 4-5.

FIG. 7 is a block diagram of a system 700 for implementing the processes and/or subprocesses described above according to aspects of the disclosure, for example FIGS. 4-5. As shown, the system 700 may include a computing device 710 and a client computing device 720.

The computing device 710 may include at least one processor 712, at least one memory 714, and any other components typically present in general purpose computers. The memory 714 may store information accessible by the processor 712, such as instructions that may be executed by the processor or data that may be retrieved, manipulated, or stored by the processor. The memory 714 and/or processor 712 can be programmed to carry out a set of logical or arithmetic operations. In one example, the logical or arithmetic operations may be stored on a non-transitory computer readable medium. The processor obtains information from memories, performs logical or arithmetic operations based on programmed instructions, and stores the results of the operations into memories. Although FIG. 7 illustrates processor 712 and memory 714 as being within the same block, it is understood that the processor 712 and memory 714 may respectively comprise one or more processors and/or memories that may or may not be stored in the same physical housing. In one example, computer 710 may be a server that communicates with one or more client devices 720, directly or indirectly, via a network (not shown). The computing device 710 can interact with users through input and output devices (not shown), such as keyboards, mouses, disks, networks, displays and printers.

The client computing device 720 may be configured similarly to the computer 710, such that it may include processor 722, a memory 724, and any other components typically present in a general purpose computer. The client device 720 may be any type of computing device, such as a personal computer, tablet, mobile phone, laptop, PDA, etc. In this example, the client device 720 may also include a display 726, such as an LCD, plasma, touch screen, or the like.

The computer executable processing component described in the present disclosure can be executed by the processor(s) of one or more computing devices, such as computing device 710 and/or client computing device 720, or any other computing device.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while one AIG example is shown for illustrative purpose, any design netlist can be employed in accordance with the teachings herein.

Accordingly, this description is meant to be taken only by way of example, and not to otherwise limit the scope of this invention.

What is claimed is:

1. A method for correcting gate-level simulation, comprising:
   identifying unknown values (Xs) that are false when simulating a given trace of a design netlist;
   determining a sub-circuit of the design netlist for each false X having inputs of real Xs and an output of a false X;
   generating code to correct each false X in simulation based on the sub-circuit to eliminate false Xs in simulation of the design netlist;
   converting the sub-circuit into an And-Inverter-Graph (AIG);
   calculating a structure-based hash number associated with the AIG; and
   looking up at least one vector from a vector database using the hash number.

2. The method of claim 1, wherein the vector database saves vectors that can distinguish outputs of an AIG with the same hash number.

3. The method of claim 2, wherein if vectors for the hash number exist, the vectors are applied to primary inputs of the AIG to replace random patterns for simulation.

4. The method of claim 1, further comprising:
   if a status of outputs of the AIG cannot be determined, formally analyzing the AIG.

5. The method of claim 4, wherein if the outputs of the AIG are not constant vectors, generating vectors that can distinguish all outputs and saving the generated vectors into the vector database.

6. The method of claim 5, wherein the generating vectors is performed online during simulation or offline after simulation.

7. The method of claim 1, wherein the hash number is a two-level hash number, with a first level being number of inputs of the AIG and a second level being a 32-bit integer.

8. The method of claim 1, wherein generating vectors comprises converting the AIG to a Conjunctive Normal Form (CNF).

9. A system for correcting gate-level simulation, comprising:
- a memory having program instructions stored thereon; and
- a processor configured to:
  - identify unknown values (Xs) that are false when simulating a given trace of a design netlist;
  - determine a sub-circuit of the design netlist for each false X having inputs of real Xs and an output of a false X;
  - generate code to correct each false X in simulation based on the sub-circuit to eliminate false Xs in simulation of the design netlist;
  - convert the sub-circuit into an And-Inverter-Graph (AIG);
  - calculate a structure-based hash number associated with the AIG; and
  - look up at least one vector from a vector database using the hash number.

10. The system of claim 9, wherein the vector database saves vectors that can distinguish outputs of an AIG with the same hash number.

11. The system of claim 10, wherein if vectors for the hash number exist, the vectors are applied to primary inputs of the AIG to replace random patterns for simulation.

12. The system of claim 9, wherein the processor is further configured to:
- if a status of outputs of the AIG cannot be determined, formally analyze the AIG.

13. The system of claim 12, wherein if the outputs of the AIG are not constant vectors, generating vectors that can distinguish all outputs and saving the generated vectors into the vector database.

14. The method of claim 13, wherein the generating vectors is performed online during simulation or offline after simulation.

15. The method of claim 9, wherein the hash number is a two-level hash number, with a first level being number of inputs of the AIG and a second level being a 32-bit integer.

16. The system of claim 1, wherein generating vectors comprises converting the AIG to a Conjunctive Normal Form (CNF).

17. A method for determining if a sub-circuit generates constant value, comprising:
- determining whether outputs of a sub-circuit in a simulation are constant;
- converting the sub-circuit into an And-Inverter-Graph (AIG);
- calculating a structure-based hash number associated with the AIG;
- looking up at least one vector from a vector database using the hash number; and
- simulating the AIG using the at least one vector to determine sub-circuit output status.

18. A system for determining if a sub-circuit generates constant value, comprising:
- a memory having program instructions stored thereon; and
- a processor configured to:
  - determine whether outputs of a sub-circuit in a simulation are constant;
  - convert the sub-circuit into an And-Inverter-Graph (AIG);
  - calculate a structure-based hash number associated with the AIG;
  - look up at least one vector from a vector database using the hash number; and
  - simulate the AIG using the at least one vector to determine sub-circuit output status.

19. The method of claim 1, wherein the output of the false X is constant 0 or 1, but not both.

* * * * *